US009258063B1

United States Patent
Oomori

(10) Patent No.: US 9,258,063 B1
(45) Date of Patent: Feb. 9, 2016

(54) OPTICAL TRANSMITTER HAVING MULTIPLE OPTICAL SOURCES AND A METHOD TO ACTIVATE THE SAME

(71) Applicant: SUMITOMO ELECTRIC INDUSTRIES, LTD., Osaka-shi, Osaka (JP)

(72) Inventor: Hirotaka Oomori, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/524,058

(22) Filed: Oct. 27, 2014

(51) Int. Cl.
H04B 10/00 (2013.01)
H04B 10/50 (2013.01)
H04B 10/564 (2013.01)
H04J 14/00 (2006.01)

(52) U.S. Cl.
CPC ............ H04B 10/503 (2013.01); H04B 10/564 (2013.01)

(58) Field of Classification Search
CPC . H01S 3/042; H01S 3/02407; H01S 3/02415; H04B 10/40; H04B 10/50
See application file for complete search history.

(56) References Cited

U.S. PATENT DOCUMENTS

2008/0159348 A1* 7/2008 Lipkin ................ H01S 5/02415 372/34
2008/0310851 A1* 12/2008 Ichino .................... H04B 10/40 398/135

FOREIGN PATENT DOCUMENTS

| JP | 2003-273447 A | 9/2003 |
| JP | 2006-054316 A | 2/2006 |
| JP | 2008-312046 A | 12/2008 |

OTHER PUBLICATIONS

Japanese Patent Application No. 2013-194327, filed Sep. 19, 2013 in Japan.

* cited by examiner

*Primary Examiner* — Daniel Dobson
(74) *Attorney, Agent, or Firm* — Global IP Counselors, LLP

(57) ABSTRACT

An algorithm to reduce a peak current for a transmitter module with multiple laser diodes (LDs) is disclosed. When the current temperature of the LDs is higher than the target temperature, the thermo-electric cooler (TEC) controller is first activated then the LD driver to drive the LDs is subsequently activated with a substantial delay. When the ambient temperature of the LDs is lower than the target temperature, the LD driver is first driven; then, the TEC controller is subsequently activated.

12 Claims, 14 Drawing Sheets

OPTICAL TRANSMITTER HAVING MULTIPLE OPTICAL SOURCES AND A METHOD TO ACTIVATE THE SAME

BACKGROUND OF THE INVENTION

1. Field of the Invention

The present application relates to a method to activate or start an optical transmitter module that installs a semiconductor laser diode (LD), an LD driver, and a thermo-electric cooler (TEC) to control a temperature of the LD.

2. Related Background Arts

An optical transceiver usually provides an optical transmitter to transmit an optical signal and an optical receiver to receive another optical signal. The optical transmitter often installs a TEC to mount the LD thereon in order to set an oscillation wavelength of the LD and optical power output from the LD by maintaining a temperature of the LD in constant. The optical transceiver often installs other optical and electrical components. When the optical transceiver is powered on, or recovered from a power saving mode; a large current sometimes flows in the optical transceiver, which is often called as a rush current. In particular, when a difference between an ambient temperature and the target temperature of the LD is large, the rush current flowing in the TEC often becomes large. In order to reduce the rush current, one type of optical transceivers restricts a current flowing in the TEC depending on the current temperature of the LD and an ambient temperature in the optical transceiver.

An enhanced transmission speed and capacity by an optical transceiver with a small-sized package have been continuously requested in the field of the optical communication. Assembly density of an optical transceiver, and/or an optical transmitter is further increased, which inevitably makes a position of a driver to drive the LDs close enough to the TEC, or a driver is sometimes directly mounted on the TEC. In such an arrangement, heat generated by the driver affects the terminal stability of the TEC, and the rush current of the TEC becomes larger.

SUMMARY OF THE INVENTION

One aspect of the present application relates to an optical transmitter to be installed within an optical transceiver. The optical transmitter of the invention is operable between a power saving mode and an operating mode. The optical transmitter in the power saving mode actives limited circuit elements necessary to communicate with a host device. The change from the power saving mode to the operating mode, similar to a process to start up the optical transceiver, a large rush current flows therein and prolongs a period for the TEC to be stable. Some procedures to restrict the rush current and accelerate the thermal stabilization of the TEC are required.

The optical transmitter of the present invention provides a transmitter module, a TEC controller, an ambient temperature sensor and a micro-control-unit (MCU). The transmitter module installs a plurality of LDs, a driver for driving the LDs, and a TEC that mounts the LDs and the driver thereon. The TEC controller sets temperatures of the LDs mounted on the TEC in a target temperature. The MCU controls the TEC controller and the LD driver, when the optical transmitter changes from the power saving mode to the operating mode, so as to activate the TEC controller first prior to the activation of the LD driver when the ambient temperature sensed by the ambient temperature sensor is higher than the target temperature, but first activates the LD driver prior to the TEC controller when the ambient temperature is lower than the target temperature.

Another aspect of the present invention relates to a method to change an optical transmitter from the power saving mode to the operating mode, the optical transmitter comprising a transmitter module including a plurality of laser diodes (LDs), a driver configured to driver the LDs electrically, and a thermo-electric cooler (TEC) that mounts the LDs and the driver thereon. The method of the present inventions includes steps of: (a) sensing an ambient temperature of the transmitter module; (2) comparing the ambient temperature with a target temperature of the LDs; and (3), when the ambient temperature is higher than the target temperature, first activating the TEC controller in advance to activation of the driver, but, when the ambient temperature is lower than the target temperature, first activating the driver in advance to activation of the TEC controller.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Next some embodiments of the present invention will be described as referring to drawings. In the description of embodiments, numerals or symbols same or similar to each other will refer to element same or similar to each other without duplicated explanation.

First Embodiment

Figure 1:
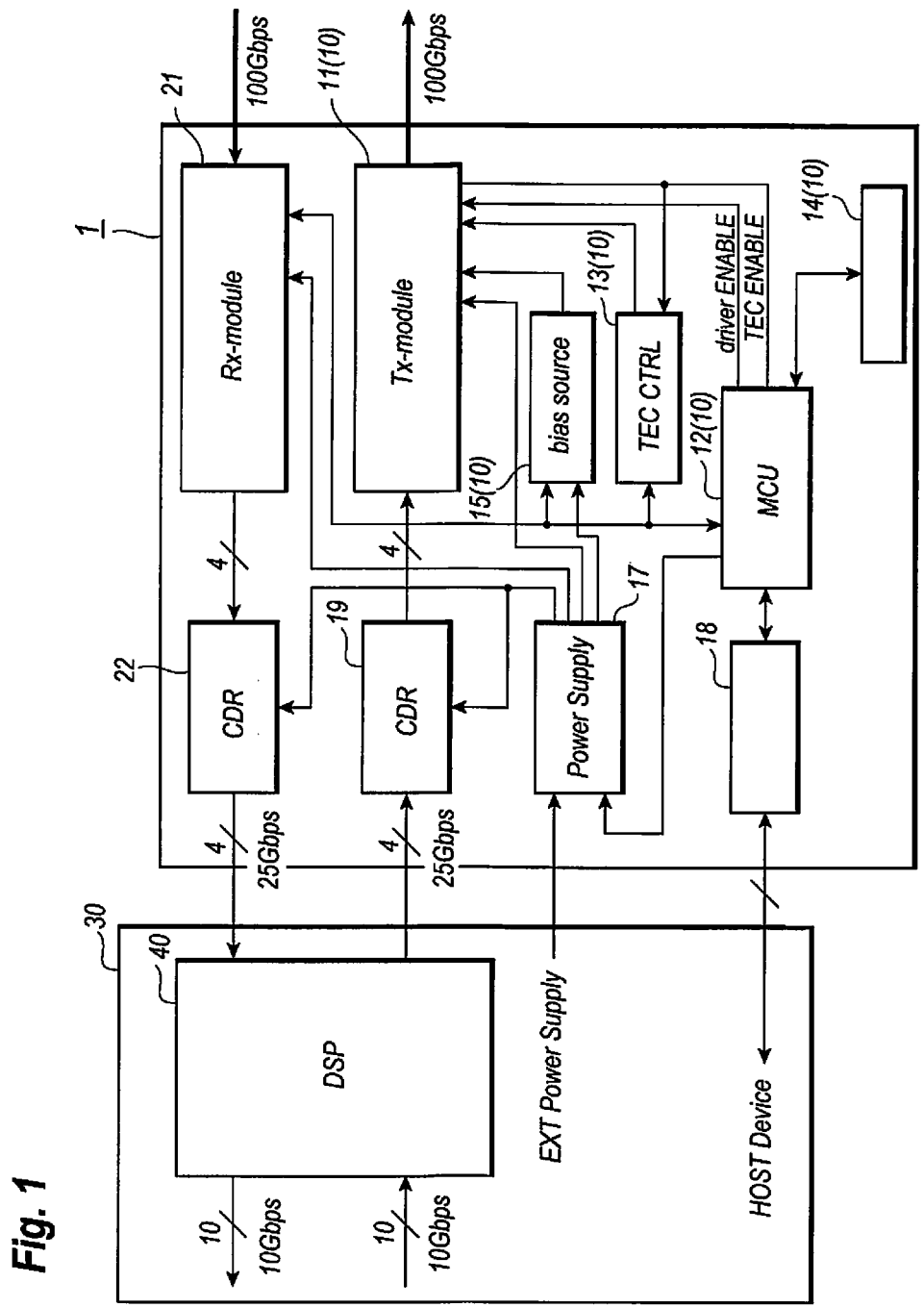
FIG. 1 shows a functional block diagram of an optical transceiver according to an embodiment of the present invention.

FIG. 1 shows a functional block diagram of an optical transceiver according to the first embodiment of the invention. The optical transceiver 1, which is the type of the pluggable optical transceiver, transmits an optical signal and receives another optical signal, where the optical signals contain four wavelengths in the 1300 nm band, to perform the full-duplex optical communication with the speed of 100 Gbps. Such an optical transceiver in the physical dimensions, the pin distributions, the electrical and optical specifications, and so on, has been ruled in one of multi-source agreements (MSAs) concerning to CFP2 (Centium Form-factor Pluggable), CFP4 and so on.

The optical transceiver 1 primarily comprises a transmitter module (Tx module) 11, a micro-control unit (MCU) 12, a thermo-electric cooler controller (TEC controller) 13, an ambient temperature sensor 14, a bias current source 15, an internal power supply 17, a peripheral controller 18, clock-data recoveries (CDRs), 19 and 22, and a receiver module (Rx module) 21.

The Tx module 11 generates a wavelength multiplexed optical signal with the speed of 100 Gbps by converting four electrical signals each having the speed of 25 Gbps into four optical signals independent of others and having wavelengths specific to respective optical signals and different from others, and multiplexing thus converted optical signals into the wavelength multiplexed optical signal. Four (4) electrical signals input to the Tx module 11 each having the speed of 25 Gbps are first converted in an integrated circuit (IC) 40, such as a Gearbox, FPGA, DSP and/or ASIC, from ten (10) signals each having a speed of 10 Gbps into the four signals with 25 Gbps, then processed by the CDR 19 to recover the clock contained in the four signals.

The Rx module 21 receives one wavelength multiplexed optical signal with the equivalent speed of 100 Gbps, de-multiplexes four optical signals from thus received optical signal, regenerates four electrical signals each having the speed of 25 Gbps from respective de-multiplexed optical signals. The CDR 22 recovers the clock contained in the electrical signals thus re-generated by the Rx module 21 and re-times these four electrical signals. Finally, the IC 40 further converts the four (4) electrical signals with the speed of 25 Gbps into ten (10) electrical signals each having the speed of 10 Gbps.

Among those units above described, the Tx module 11, the MCU 12, the TEC controller 13, the ambient temperature sensor 14, and the bias current source 15 constitute an optical transmitter 10. Details of the optical transmitter 10 will be described as referring to FIG. 2, which is a functional block diagram of the optical transmitter 10.

The Tx module 11 includes four LDs 51, an LD driver 52, an optical multiplexer 53, a TEC 54, and a temperature sensor 55. A package of the Tx module 11 installs those elements, 51 to 55, described above to constitute a transmitter optical sub-assembly (TOSA).

Figure 2:
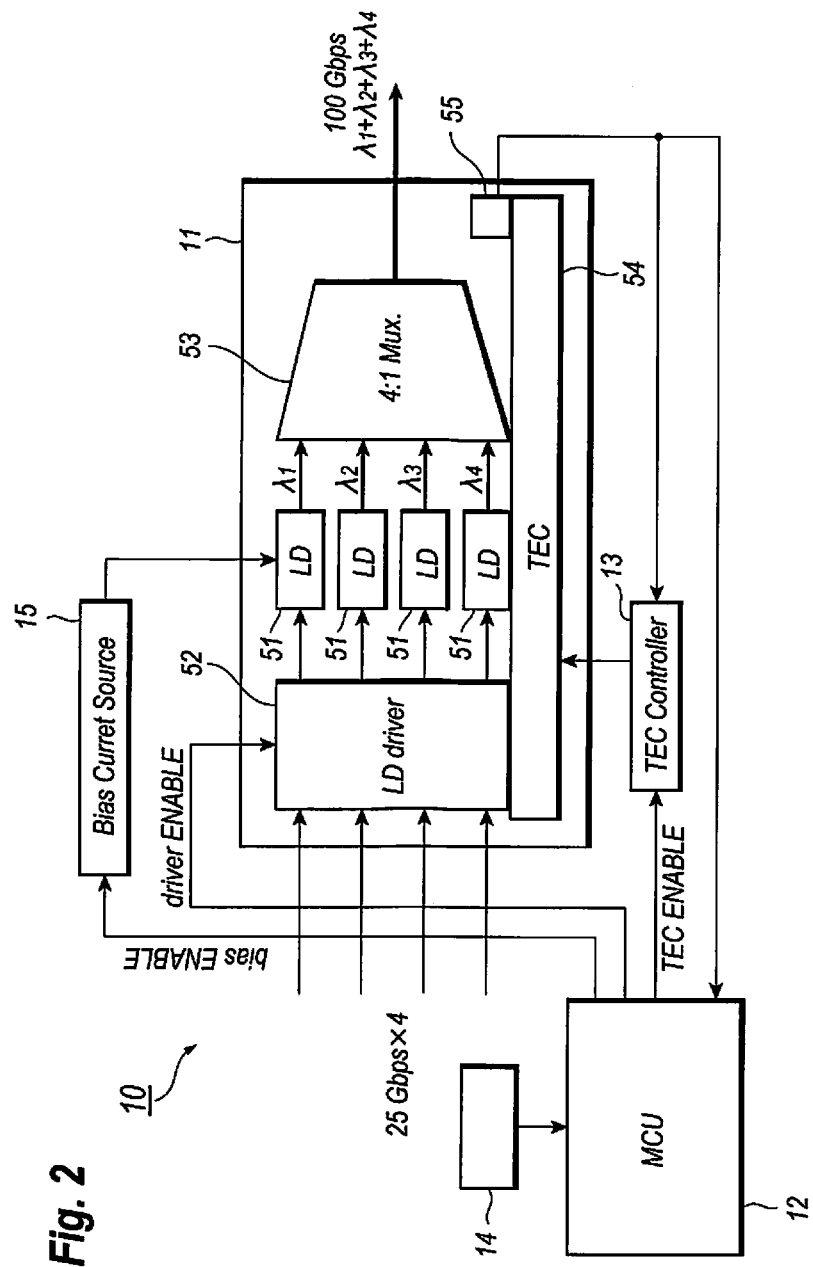
FIG. 2 shows a functional block diagram of an optical transmitter installed in the optical transceiver shown in FIG. 1.

The LDs 51 may be the type of, for instance, the distributed feedback (DFB) LD, the Fabry-Perot LD, and/or, the vertical cavity surface emitting laser diode (VCSEL). The LDs 51 are connected to the bias current source 15 to receive respective bias currents. When the bias current source 15 ceases the bias currents, the LDs 51 break the emission. The MCU 12 controls the supply and the break of the bias current by sending bias ENABLE to the bias current source 15. FIG. 2 illustrates four LDs 51 stacked on the TEC 54. However, the TEC 54 directly mounts four LDs 51 thereon. Thus, the LDs 51 are directly and thermally coupled with the TEC 54.

The LD driver 52 generates driving signals provided to respective LDs 51 to modulate the emission of the LDs 51 depending on BIAS ENABLE sent from the MCU 12. The LD driver 52 integrates four driving circuits each driving respective LDs 51 in parallel. Each of the driving circuits corresponds to the respective LDs 51. The driving signals may be activated or inactivated depending on the driver ENABLE sent from the MCU 12. For instance, when the driver ENABLE is asserted, the driving signals become active, or all of the driving circuits become active to modulate respective LDs 51. One the other hand, when driver ENABLE is negated, the all of the driving signals or all of the driving circuits become inactive. The LD driver 52 is preferable to save the power consumption thereof when driver ENABLE provided from the MCU 12 is negated. The LD driver 52 is often mounted on the TEC 54 to couple with the TEC 54 thermally to set the operation of the LD driver 52 independent of the temperature. As the transmission speed becomes faster, the LD driver 52 in the power consumption thereof becomes greater. The present LD driver 52 which operates in 25 Gbps consumes the power of several watts.

The optical multiplexer 53 multiplexes four optical signals, which are output from the LDs 51 and have respective wavelengths specific thereto and different from others, depending on the wavelengths and generates one wavelength multiplexed optical signal with the equivalent transmission speed of 100 Gbps. An optical multiplexer with large temperature dependence is preferable to be mounted on a TEC. The optical multiplexer 53 may be a type of a combined optical filter each having optical thin films, and/or an arrayed waveguide grating (AWG).

The TEC 54 is a device to cool down or heat up a temperature of the LDs 51 by the thermo-electric effect. Keeping the temperature of the top plate of the TEC in T0, the LDs 51 are controlled in emission wavelengths thereof in respective target wavelengths. The temperature T0 is called as the target temperature. Assuming the temperature of the bottom plate of the TEC is T4, the TEC 54 cools the top plate down when the target temperature T0 is lower than that of the bottom plate (T4>T0). On the other hand, when the target temperature T0 is higher than the temperature T4 of the bottom plate (T4<T0), the TEC 54 heats the top plate up. The current supplied to the TEC 54 is necessary to be reversed in the direction thereof between two modes, namely, cooling down and heating up. Accordingly, the TEC 54 is necessary to be driven by a specific driver providing a function to reverse the direction of the current flowing, typically, an H-bridge circuit. The TEC 54 consumes greater power depending on a difference between the temperatures, namely, the target temperature T0 and the temperature T4 of the bottom plate. The TEC 54 and the TEC controller 13 usually consume several watts to cool down or heat up the top plate of the TEC against the bottom plate.

The temperature of the top plate of the TEC 54 is sensed by the temperature sensor 55, which is typically a thermistor and mounted on the top plate of the TEC 54. A thermistor shows large temperature dependence in resistance thereof; accordingly, the temperature of the top plate may be detected as a voltage signal by a resistive divider. The TEC controller 13 and the MCU 12 receive thus obtained voltage signal from the temperature sensor 55; in particular, the MCU 12 acquires the voltage signal in a digital form by a constant period of, for instance, several scores of milliseconds to several hundreds of millisecond. Because the temperature sensor 55 is mounted on the TEC 54, and the LDs 51 is also mounted thereon, the temperature of the LDs 51 may be equivalent to the temperature detected by the temperature sensor 55.

The MCU 12 controls the TEC controller 13, the LD driver 52, and the bias current source 15 by sending ENABLE signals to respective units. Each of ENABLE signals has the first priority to activate and/or inactivate respective units, but preferably has a function to save the power consumption of the units. The MCU 12 is indirectly controlled by the host device 30 through the peripheral controller 18 that is connected with the host device 30 by the communication bus such as, what is called, MDIO and/or I2C bus.

Specifically, the MCU 12, under the control of the host device 30, changes the operation of the Tx module 11 between the operating mode and the power saving mode. The power saving mode sets the TEC controller 13, the LD driver 52, and the LDs 51 (or the bias current source 15) in a halt. That is, only a limited portion of the control unit including the MCU 12 and a unit to communicate with the host device 30 are waked during a period of, for instance, the initialization of the optical transceiver 1 and the power saving mode. In an alternative, the power saving mode may halt the Rx module 21, the CDR 19, the internal power supply 17, and so on.

The operating mode operates the TEC controller 13, the LD driver 52, and the LDs 51, namely, the bias current source 15. That is, under the control of the host device 30, all of units of the Tx module 11, the Rx module 21, and the units to control these modules, 11 and 12, are operable to perform the optical transmission and the optical reception. Because two modes of the operating mode and the power saving mode may be alternately set, the transition from the power saving mode to the operating mode is not limited to the initialization procedures of the optical transceiver 1 after the power supply turns on. Also, the activation of respective units is not only the initialization after the power supply turns on but includes the transition from the operating mode. The transition from the power saving mode to the operating mode by the MCU 12 will be further described later.

The TEC controller 13 sets the temperature of the LDs 51 close to a target temperature T0 based on the command output from the MCU 12. Specifically, the TEC controller 13, which is connected to the TEC 54, starts to drive the TEC 54 by receiving TEC ENABLE output from the MCU 12. The control of the TEC 54 by the TEC controller 13 is carried out by a negative feedback loop often called as ATC (Automatic Temperature Control). That is, the temperature of the top plate of the TEC 54 is sensed by the temperature sensor 55, and the TEC driver 13 heats up and/or cools down the temperature of the top plate of the TEC 54 by adjusting the magnitude and the direction of the driving current supplied to the TEC 54 so as to set the sensed temperature of the top plate close to the target temperature.

The ambient temperature sensor 14 senses an ambient temperature 1 of the Tx module 11 which is equivalent to an inner temperature of the optical transceiver 1. The MCU 12 acquires the data concerning to the ambient temperature by a preset interval for several scores to several hundreds of milliseconds.

Figure 3:
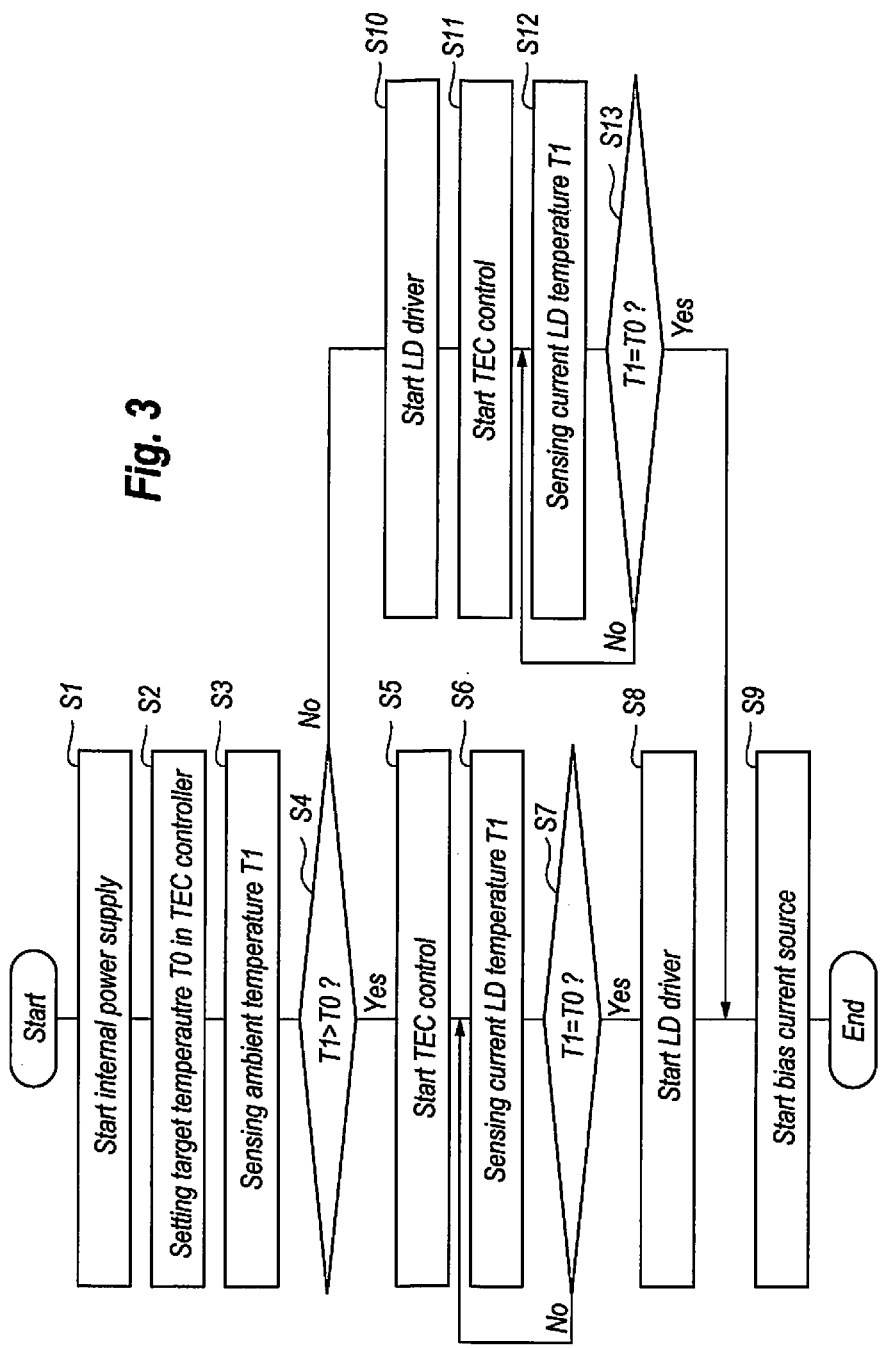
FIG. 3 is a flow chart to activate the optical transceiver shown in FIG. 1.

Procedures to switch the power saving mode to the operation mode will be described as referring to FIG. 3 which is a flow-chart of the initialization procedures of the optical transceiver 1.

First, the MCU 12 activates the internal power supply 17 at step S1. The internal power supply 17 generates, from an externally supplied power, at least one inner power supply provided to the Tx module 11 and the bias current source 15. The MCU 12 controls the internal power supply 17 through a command line and/or a serial communication bus whether the internal power supply provides the inner power supply to the Tx module 11 and/or the bias current source 15 or not.

Subsequently, the MCU 12 sets the target temperature T0 for the LDs 51 in the TEC controller 13 at step S2. The MCU 12 may fetch the target temperature T0 from a memory, which is not shown in the figures, and set thus fetched target temperature T0 in the TEC controller 13. Or, the target temperature T0 may be stored in the TEC controller 13, and the TEC controller 13 reads this target temperature T0 by the command output from the MCU 12.

Step S3 senses an ambient temperature within the optical transceiver 1 by the ambient temperature sensor 14. Specifically, the MCU 12 acquires a digital value, which corresponds to the ambient temperature T1 and is stored in a register in the ambient temperature sensor 14, through the serial bus. In an alternate, the MCU 12 may estimate the ambient temperature T1 by acquiring a data corresponding to the ambient temperature through a signal line specifically allocated to the ambient temperature sensor 14 and performing predetermined calculations for thus acquired data. The MCU 12 may sense the ambient temperature T1 by a constant period.

The MCU 12 subsequently compares the ambient temperature T1 with the target temperature T0 at step S4. In other words, the MCU 12 judges whether the ambient temperature T1 is higher than the target temperature T0 of the LDs 51. Depending on the judgment, the sequence of supplying the power to the TEC controller 13, the LD driver 52, and the bias current source 15 is decided.

In step S4, when the ambient temperature T1 is higher that the target temperature T0, that is, the top plate of the TEC 54 is necessary to be cooled down, the MCU 12 first activates the TEC controller 13 at step S5, which starts the change of the mode of the optical transceiver 1 from the power saving mode to the operating mode. The TEC controller 13, which is activated, cools the temperature of the LDs 51 down to the target temperature T0. As described, the temperature of the LDs 51 may be sensed by the temperature sensor 55 and output to the MCU 12 by the constant period at step S6.

The MCU 12 checks whether the temperature of the LDs 51 sensed by the temperature sensor 55 becomes close to the target temperature T0 at step S7. When the temperature of the LDs 51 enters within a preset range around the target temperature T0, the MCU 12 activates the LD driver 52 at step S8. Until the temperature of the LDs 51 enters the preset range around the target temperature T0, the steps S6 and S7 are iterated. The judgment whether the temperature of the LDs 51 enters within the preset range around the target temperature T0 may be done by the TEC controller 13, or by the MCU 12 as receiving the current temperature T1 from the temperature sensor 55.

After the activation of the LD driver 52 and the current flowing in the TEC 54 becomes stable, the MCU 12 activates the bias current source 15 at step S9, which activates the LDs 51 to generate light and to transmit thus generated light. Thus, the procedures to switch to the operating mode from the power saving mode may be completed. In the procedures, the power saving mode continues until the activation of the TEC controller 13, the transition mode from the power saving mode to the operating mode continues until the bias current source 15 is activated. The operating mode corresponds to a period after the activation of the bias current source 15.

On the other hand, when the ambient temperature T1 of the Tx module 11 is lower than the target temperature T0 at step S4, that is, when the top plate of the TEC 54 should be heated up, the MCU 12 first activates the LD driver 52 at step S10. The start of the LD driver 52 triggers the transition procedures from the power saving mode to the operating mode.

Subsequent to the start of the LD driver 52, the MCU 12 starts the TEC controller 13, at step S11, which raises the temperature of the top plate of the TEC 54, equivalently, the temperature of the LDs 51 toward the target temperature T0. The temperature sensor 55 senses the temperature of the top plate, or that of the LDs 51 and the MCU 12 acquires the temperature of the LDs 51 thus obtained with a constant interval in step S12.

The MCU 12 subsequently checks whether the temperature of the LDs 51 enters within a preset range around the target temperature T0 at step s13. When the temperature of the LDs 51 is within the preset range around the target temperature T0, the MCU 12 turns on the bias current source 15 in step S9, which activates the LDs 51 to emit light and to commence the optical transmission. The optical transceiver 1 completes the transition mode from the power saving mode to the operating mode. Steps S12 and S13 are iterated until the temperature of the LDs 51 are within the preset range around the target temperature T0. The judgment where the temperature of the LDs 51 is within the preset range around the target temperature T0 may be carried out by the TEC controller 12 as described, or by the MCU 12.

The optical transmitter 10 of the present embodiment varies the sequence to activate the TEC controller 13 and the LD driver 52 from the power saving mode to the operating mode depending on the ambient temperature of the Tx module 11 sensed by the ambient temperature sensor 14. Specifically, when the ambient temperature T1 is higher than the target temperature T0, that is, the top plate of the TEC 54 is necessary to be cooled down to lower the temperature of the LDs 51, the TEC controller 13 is activated prior to the activation of the LD driver 52; and the LD driver 52 is activated after the temperature of the LDs 51 is close to the target temperature T0, specifically, the temperature of the LDs 51 enters within the preset range around target temperature T1.

When the optical transceiver 1 has a compact housing, such as those following the standards of CFP2, CFP4 and so on, the TEC 54 mounts the LDs 51 and the LD driver 52 thereon as those of the present embodiment. In such an arrangement, the LDs 51 are thermally coupled with the LD driver 52. When the LD driver 52 is first activated, heat generated by the activated LD driver 52 affects the operation of the TEC 54. Specifically, the current supplied to the TEC 54 to cool down the top plate thereof inevitably increases.

Turning on the TEC controller 13 prior to the activation of the LD driver 52 when the temperature of the LDs 51 is cooled down, the present sequence effectively suppresses the increase of the peak TEC current due to the heat generated by the LD driver 52. That is, when the LD driver 52 is first activated, the TEC current temporarily increases to absorb the heat generated by the LD driver 52 and dissipates this heat out of the Tx module 11; but the contribution of this mechanism to the TEC current appears delayed from the maximum TEC current. Accordingly, the peak TEC current does not increase.

When the ambient temperature T1 is lower than the target temperature T0, which means that the top plate of the TEC 54 is necessary to be heated up, the LD driver 52 is first activated prior to the activation of the TEC controller 13. This sequence utilizes the heat generated by the LD driver 52 in the heating of the top plate of the TEC 54, which means that the TEC current may be reduced by an amount corresponding to the heating of the LD driver 52. Thus, changing the sequence to turn on the TEC controller 13 and the LD driver 52 depending on the ambient temperature, the rush current for the TEC may be effectively suppressed.

Figure 4:
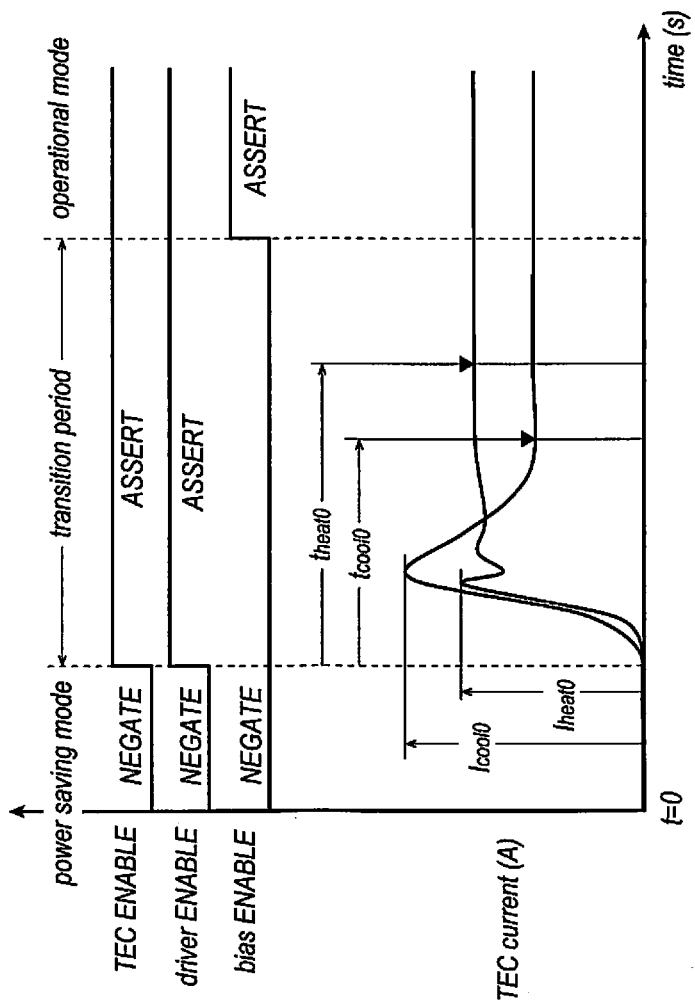
FIG. 4 shows behaviors of a TEC current according to a comparable example.
Figure 5:
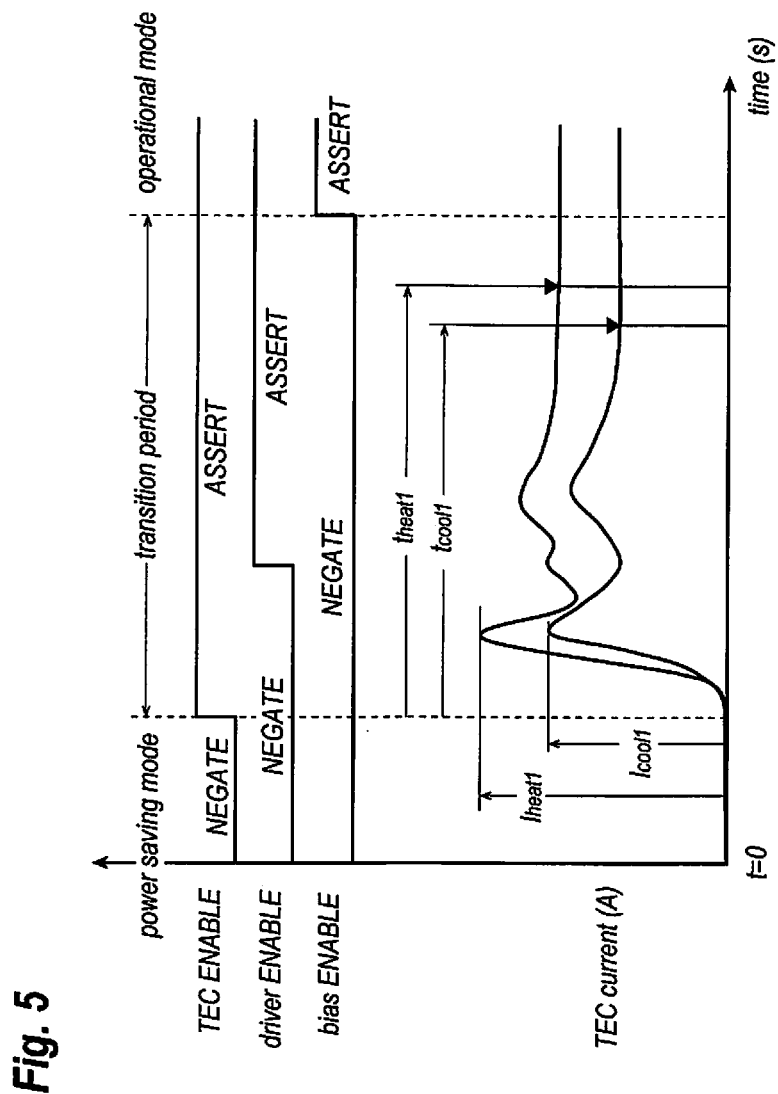
FIG. 5 shows other behaviors of a TEC current according to another comparable example.
Figure 6:
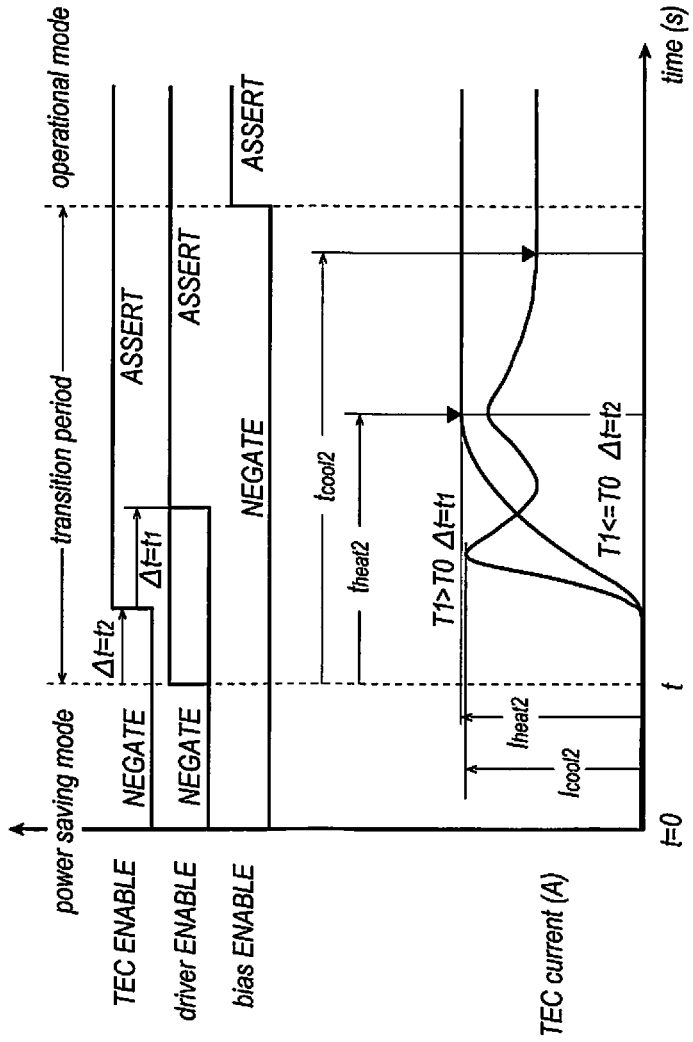
FIG. 6 shows behaviors of a TEC current of the optical transmitter shown in FIG. 2.

Next, the reduction of the peak current, in other words the rush current, of the present embodiment will be compared with that of a comparable example. FIGS. 4 and 5 show behaviors of the TEC current according to a comparable example, while, FIG. 6 shows the behaviors of the TEC current of the first embodiment. In the comparable example of FIGS. 4 and 5, the sequence to activate the TEC controller 13 and the LD driver 52 is unchanged depending on the relation between the ambient temperature T1 and the target temperature T0. The behaviors shown in FIGS. 4 to 6 correspond to a case where the temperature of the LDs 51 is lowered by cooling the top plate of the TEC and another case where the temperature of the LDs 51 is raised by heating up the top plate of the TEC 54. Furthermore, the initial temperature conditions at the activate of the TEC driver 13, that is, differences between the target temperature T0 and the ambient temperature T1 are identical for three figures of FIGS. 4 to 6.

FIG. 4 shows results where the TEC controller 13 and the LD driver 52 are activated at the same time. In FIG. 4, a value Icool0 corresponds to the peak TEC current when the top plate of the TEC 54 is cooled down to lower the temperature of the LD 51, which is called "cooling down". Another value Iheat0 denotes the peak TEC current when the top plate of the TEC 54 is heated up to raise the temperature of the LDs 51, which is called as "heating up". Also, tcool0 denotes a period until the TEC current becomes stable at the cooling down, while, theat0 denotes a period until the TEC current becomes stable. The TEC current varies the flowing direction depending on the conditions of "cooling down" and "heating up". Accordingly, FIGS. 4 to 6 show absolute behaviors of the TEC currents.

As shown in FIG. 4, the peak TEC current at heating up becomes relatively small when the two units of the TEC controller 13 and the LD driver 52 are activated at the same time; but shows a large peak current at cooling down. This is because the heat generated by the LD driver 52 affects the operation of the TEC 54. Thus, when two units of the TEC controller 13 and the LD driver 52 are activated at the same time, the peak TEC current at cooling down becomes large, no substantial reduction of the TEC current is performed.

FIG. 5 shows results of the TEC current when the LD driver 52 in the activation thereof is delayed from the activation of the TEC controller by a preset period. In FIG. 5, Icool1 and Iheat1 correspond to the peak TEC currents at the cooling down and at the heating up, respectively; while, tcool1 corresponds to a period until the TEC current becomes stable in cooling down, while, theat1 is a period until the TEC current becomes stable at heating up.

As shown in FIG. 5, when the activation of the LD driver 52 is delayed by a preset period from the activation of the TEC controller 13, the peak TEC current at cooling down becomes relatively small but that at heating up becomes large. Thus, in the sequence that the activation of the LD driver 52 is delayed from the activation of the TEC controller 13 by the preset delay, the peak TEC current at heating up becomes large so as not to suppress the increase of the peak TEC current.

That is, in a case where the LD driver 52 and the TEC controller 13 are concurrently activated without rearranging the order to activate two units depending on which temperature, T1 or T0, is higher than the other, the peak TEC current is hard to be reduced.

The present embodiment as shown in FIG. 6, when the ambient temperature T1 is higher than the target temperature T0, the LD driver 52 in the activation thereof is delayed by $\Delta t = t1$ from the activation of the TEC controller 13. On the other hand, when the ambient temperature T1 is lower than the target temperature T0, the TEC controller 13 in the activation thereof is delayed by $\Delta t = t2$ from the activation of the LD driver 13. According to these procedures, the peak TEC current may be reduced in both of heating up and cooling down conditions. In FIG. 6, a value Icool2 denotes the peak TEC current in cooling down, while, another value Iheat2 means the peak TEC current in heating up. A symbol tcool2 means a period until the TEC current becomes stable in cooling down, while, another symbol theat2 is a period until the TEC current becomes stable in heating up.

Second Embodiment

Figure 7:
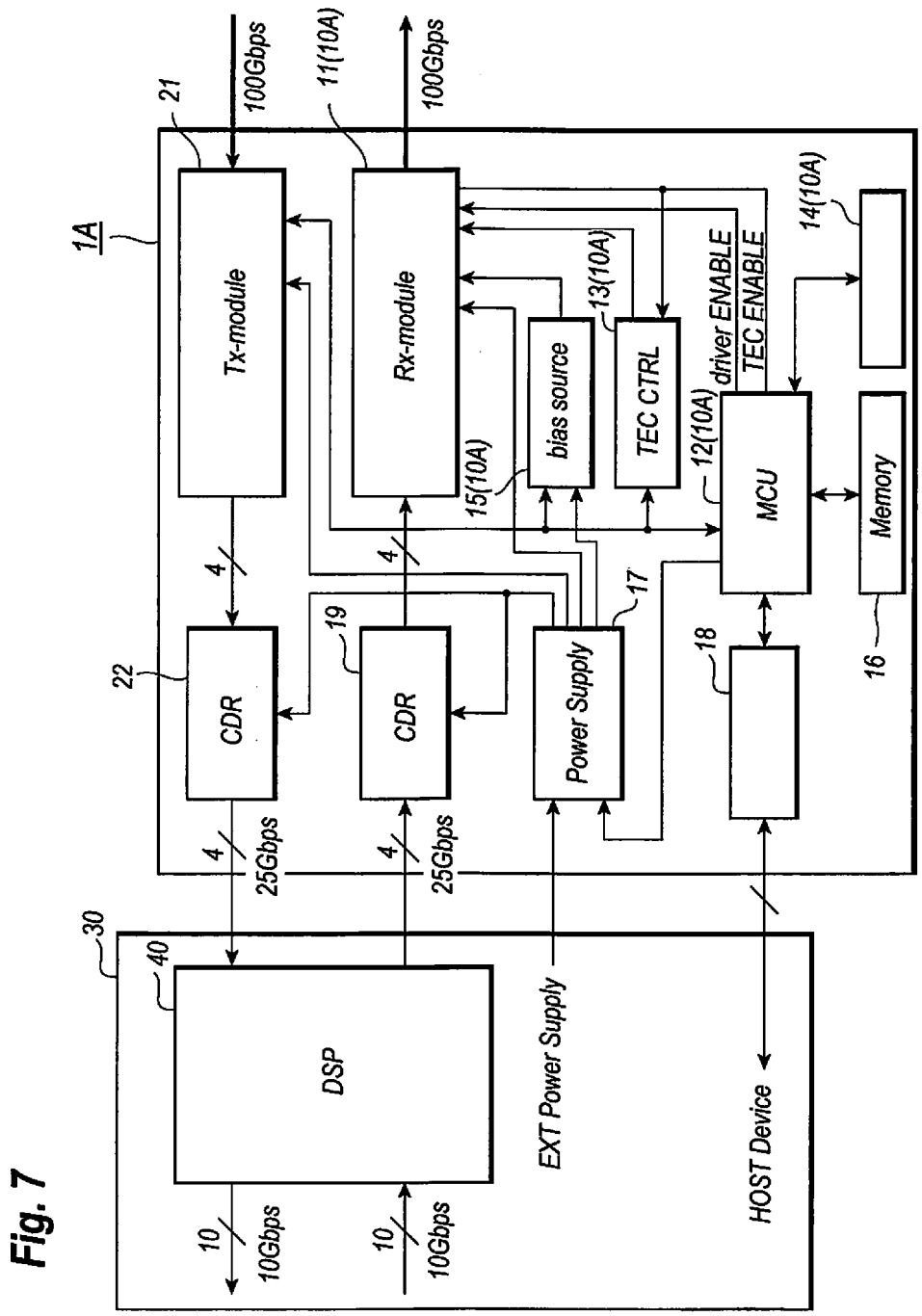
FIG. 7 is a functional block diagram of an optical transceiver according to a second embodiment of the present invention.

Next, another optical transceiver according to the second embodiment of the present invention will be described as referring to FIG. 7, which is a functional block diagram of the optical transceiver 1A of the second embodiment. The optical transceiver 1A has a feature distinguishable from that of the first embodiment that the optical transmitter 10A installs a memory 16.

Figure 8B:
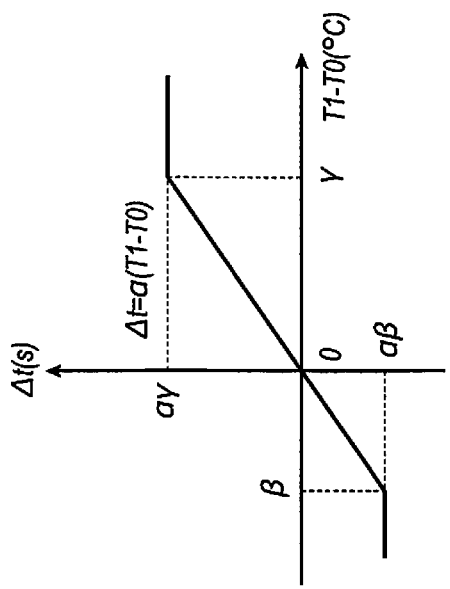
FIGS. 8A and 8B show a relation of a delay time against a difference between the target temperature and the ambient temperature.
Figure 8A:
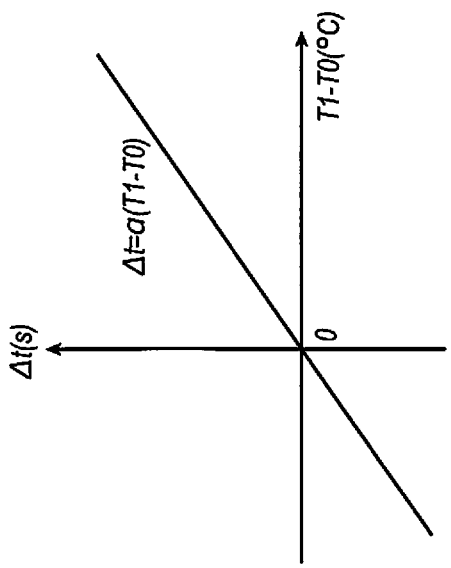

The memory 16 stores information related to ENABLE signals to the TEC controller 13 and the LD driver 52. Specifically, the memory 16 stores a parameter $\alpha$ by which a delay $\Delta t$ between the activation of the LD driver 52 and the TEC controller 13 is derived depending on a difference between the ambient temperature T1 and the target temperature T0. Some examples of the parameter $\alpha$ are shown in FIGS. 8A and 8B. For instance, the delay $\Delta t$ may have a linear relation against the difference between two temperatures, T1 and T0, and the parameter $\alpha$ corresponds to the proportional constant, namely, a slope of the linear relation. The memory stores such a parameter $\alpha$. As shown in FIG. 8A, the delay $\Delta t$ changes the sign thereof at the origin, namely, $\Delta t=T1-T0=0$, which means that, depending on the temperature difference, the order to activate the TEC controller 13 and the LD driver 52 is switched. That is, when the delay is positive, the TEC controller 13 is first activated, and subsequently, the LD driver 52 is activated with the delay $\Delta t$ from the activation of the TEC controller 13. On the other hand, when the delay $\Delta t$ is negative, the LD driver 52 is first activated then the TEC controller is activated with a delay corresponding to the absolute thereof $|\Delta t|$.

The MCU 12 may determine the delay $\Delta t$ by the parameter $\alpha$ stored in the memory 16 and the temperature difference T1-T0. As clearly understood, the relation between the delay $\Delta t$ and the temperature difference T1-T0 is extremely simple; accordingly, the MCU 12 may derive the optimum delay $\Delta t$ without any additional functions. A case where the delay $\Delta t$ is set unnecessarily long in spite of a small temperature difference T1-T0 becomes avoidable, which means that the transition from the power saving mode to the operating mode is carried out within a preset period or a specified standard.

The transition from the power saving mode to the operating mode is sometimes ruled or specified in a standard. Accordingly, the delay $\Delta t$ thus described is necessary to specify an upper limit and a lower limit. FIG. 8B shows another example of a relation of the delay $\Delta t$ against the temperature difference T1-T0. In FIG. 8B, the delay $\Delta t$ in the absolute thereof is set so as not to exceed the longer limit specified standard. For instance, when the temperature difference T1-T0 exceeds a limit $\gamma$, the delay is set constant in a limit of $\alpha\gamma$. When the temperature difference becomes less than T1-T0=$\beta$, the delay is also set in a constant of $\alpha\beta$. The parameters, $\beta$ and $\gamma$, are selected such that the delays, $\alpha\beta$ and $\alpha\gamma$, do not exceed respective specifications. Even the delays, $\alpha\beta$ and $\alpha\gamma$, are so set, a period until the temperature of the LDs 51 becomes stable not always becomes shorter than respective specifications. In such cases, other parameters, such as a TEC driving current, and so on are adjusted. In a temperature range between $\beta$ and $\gamma$, the aforementioned algorithm shown in FIG. 8A may be applicable. In the algorithm of FIG. 8B, three parameters of $\alpha$, $\beta$, and $\gamma$ are stored in the memory 16. In an alternate, the memory 16 may store a look-up-table relating the delay $\Delta t$ against the temperature difference T1-T0 not the parameters, $\alpha$ to $\gamma$.

Figure 9:
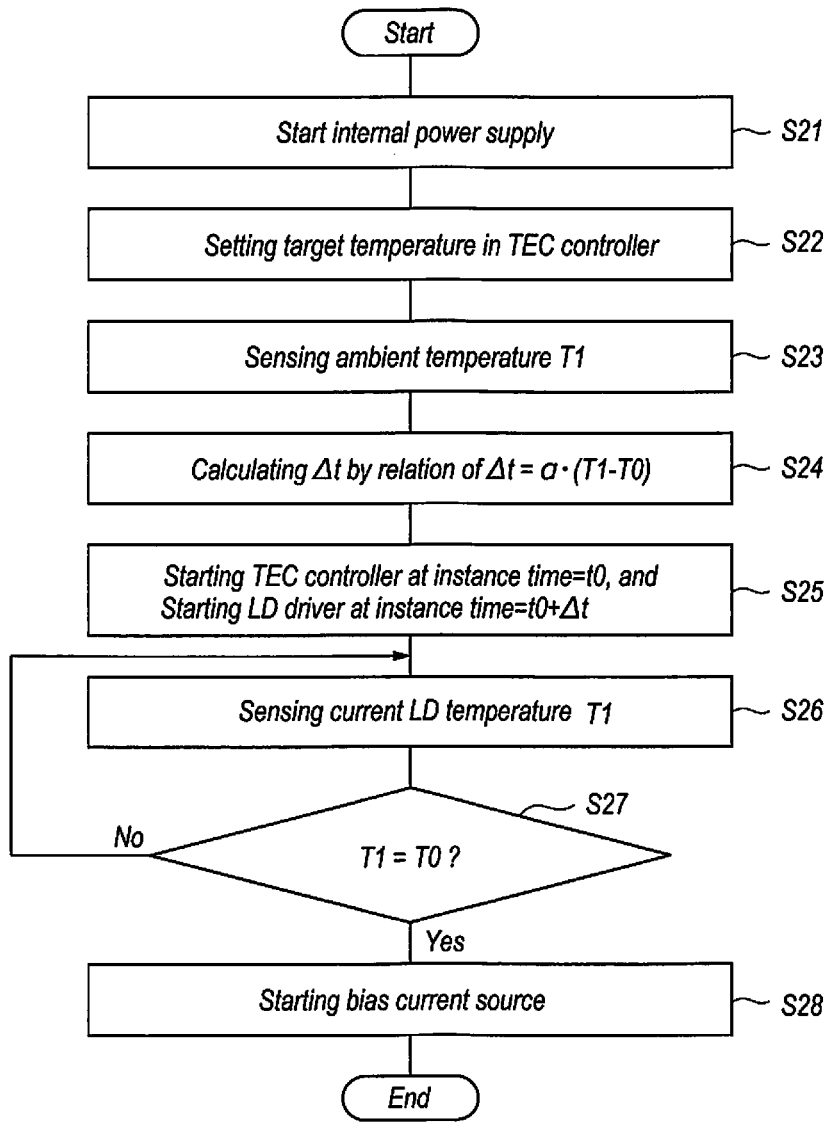
FIG. 9 is a flow chart to activate the optical transceiver of the second embodiment.

Next, a sequence of the transition from the power saving mode to the operating mode taking the delay $\Delta t$ into consideration will be described as referring to FIG. 9 which is a flow chart of the sequence corresponding to heating up where the ambient temperature T1 is lower than the target temperature T0 and the top plate of the TEC 54 is necessary to be heated up. Steps S21 to S23 are same with steps, S1 to S3, of aforementioned procedures.

Assuming that the memory 16 stores the parameter $\alpha$ (>0) that relates a temperature difference T1-T0 with the delay $\Delta t$ by a relation of $\Delta t=\alpha(T1-T0)$. At steps S24, the MCU 12 calculates the delay $\Delta t$ ($=\alpha(T1-T0)$). Because of the assumption that the ambient temperature T1 is lower than the target temperature T0, the temperature difference T1-T0 becomes negative, which also means the delay $\Delta t$ becomes negative. A negative delay $\Delta t$ corresponds to a case where the LD driver 52 is first activated, then, after a delay corresponding to an absolute of $\Delta t$, the TEC controller 13 is activated.

The MCU 12 sets a reference t0 at which the TEC controller 13 is activated, and calculates a point td=t0+$\Delta t$ to activate the LD driver 52 at step S25. Because the delay $\Delta t$ becomes negative in heating up, the LD driver 52 is first activated. On the other hand, the TEC driver 13 is first activated in cooling down because of a positive delay $\Delta t$. Steps S26 to S27 are same with those, S12 to S13, already described in the first embodiment.

Third Embodiment

Figure 10:
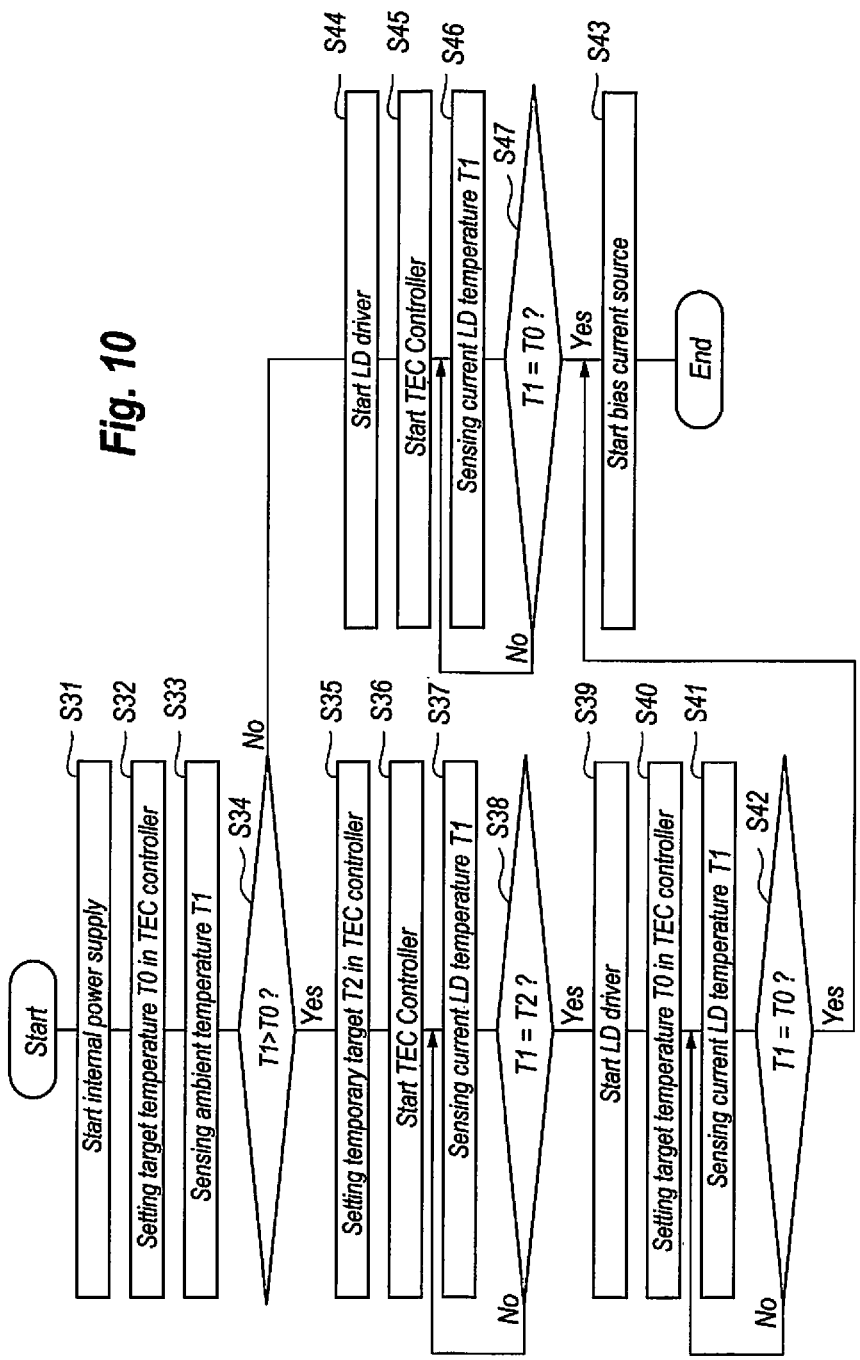
FIG. 10 is a flow chart to activate the optical transceiver of the third embodiment.

Next, the third embodiment according to the present invention will be described. Fundamental arrangements of an optical transceiver of the third embodiment are same with those of the first and second embodiments. However, the third embodiment of the optical transceiver has a distinguishable feature to set the target temperature T0 in the TEC controller 13. Procedures to set the target temperature T0 will be described as referring to FIG. 10 which shows a flow chart of the procedure.

Steps, S31 to S34, are same with those, S1 to S4, of the first embodiments. In the present procedure, when the ambient temperature T1 exceeds the target temperature T0 under a condition where the target temperature T0 is set, the MCU 12 sets in step S35 a temporary target temperature T2 lower than the target temperature T0 in the TEC controller 13.

Figure 11:
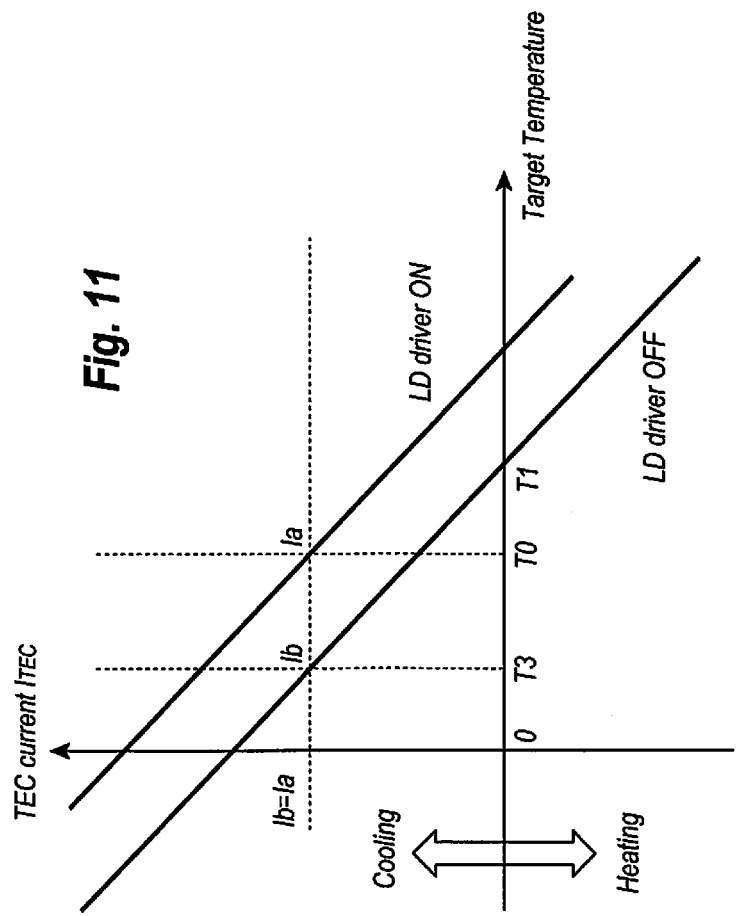
FIG. 11 shows a relation of a target temperature against the TEC current for the optical transceiver of the third embodiment.
Figure 12:
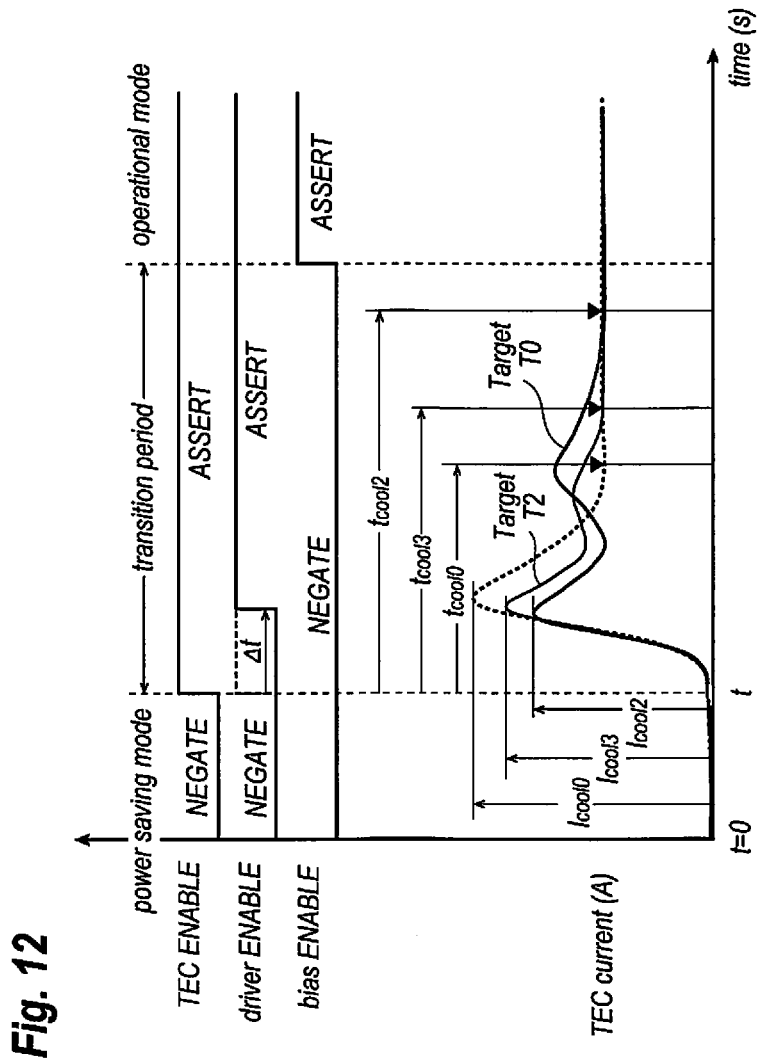
FIG. 12 shows behaviors of the TEC current of the third embodiment.

The temporary target temperature T2 is, as described above, not only lower than the target temperature T0 but higher than a lowest temperature T3 shown in FIG. 11. The lowest temperature T3 means that, assuming Ia is a TEC current when both the TEC controller 13 and the LD driver 52 are activated at the target temperature T0, a temperature when only the TEC controller 13 is activated and the TEC current Ib with the magnitude equal to the TEC current Ia flows in the TEC 54. Because the LD driver 52 is halt, the temperature of the top plate of the TEC 54 becomes lower than the target temperature T0.

Then, the MCU 12 first activates the TEC controller 13 at step S36. The temperature of the LDs 51 lowers to the temporary target temperature T2 as being sensed by the temperature sensor 55 and sent to the MCU 12 with a fixed period at step S37. The MCU 12 checks whether the sensed temperature is within a preset range around the temporary target temperature T2 or not, at step S38. When the temperature is within the preset range, the MCU 12 activates the LD driver 52 at step S39, revises the temporary target temperature T2 to the practical target temperature T0, and sets the target temperature T0 in the TEC controller 13 at step S40. Until the temperature sensed by the temperature sensor 55 enters within the present range around the temporary target temperature T2, the steps S37 and S38 are iterated. In an alternate, the TEC controller 13 instead of the MCU 12 may check whether the current temperature T1 of the LDs 51 is within the preset range around the temporary target temperature T2 or not, and send a checked result to the MCU 12.

Subsequently, the temperature sensor 55 iterates the measurement of the current temperature at step S41, and the MCU 12 checks whether the current temperature T1 of the LD 51 becomes within a preset range around the target temperature T0 at step S42. When the current temperature enters within the preset range around the target temperature T0, the MCU 12 activates the bias current source 15 at step S43. In an alternate, the TEC controller 13 may check the condition where the current temperature enters within the preset range around the target temperature T0 and sends the checked results to the MCU 12. Steps S44 to S47 and S43 are same with those of aforementioned steps of S10 to S13 and S9.

Setting the temporary target temperature T2 lower than the true target temperature T0, a period tcool3 until the TEC current becomes stable may be shortened compared with a period tcool2 where no temporary target temperature T2 is interposed. That is, the time from the power saving mode to the operating mode may be shortened. When a period from the power waving mode to the operating mode becomes so long, for instance, exceeding the specified transition time, the operating mode begins before the TEC current becomes stable, which results in a fluctuation of the wavelengths of the optical signals output from the LDs 51. The algorithm of the present embodiment to set a temporary target temperature T2 may solve this subject.

Fourth Embodiment

Figure 13:
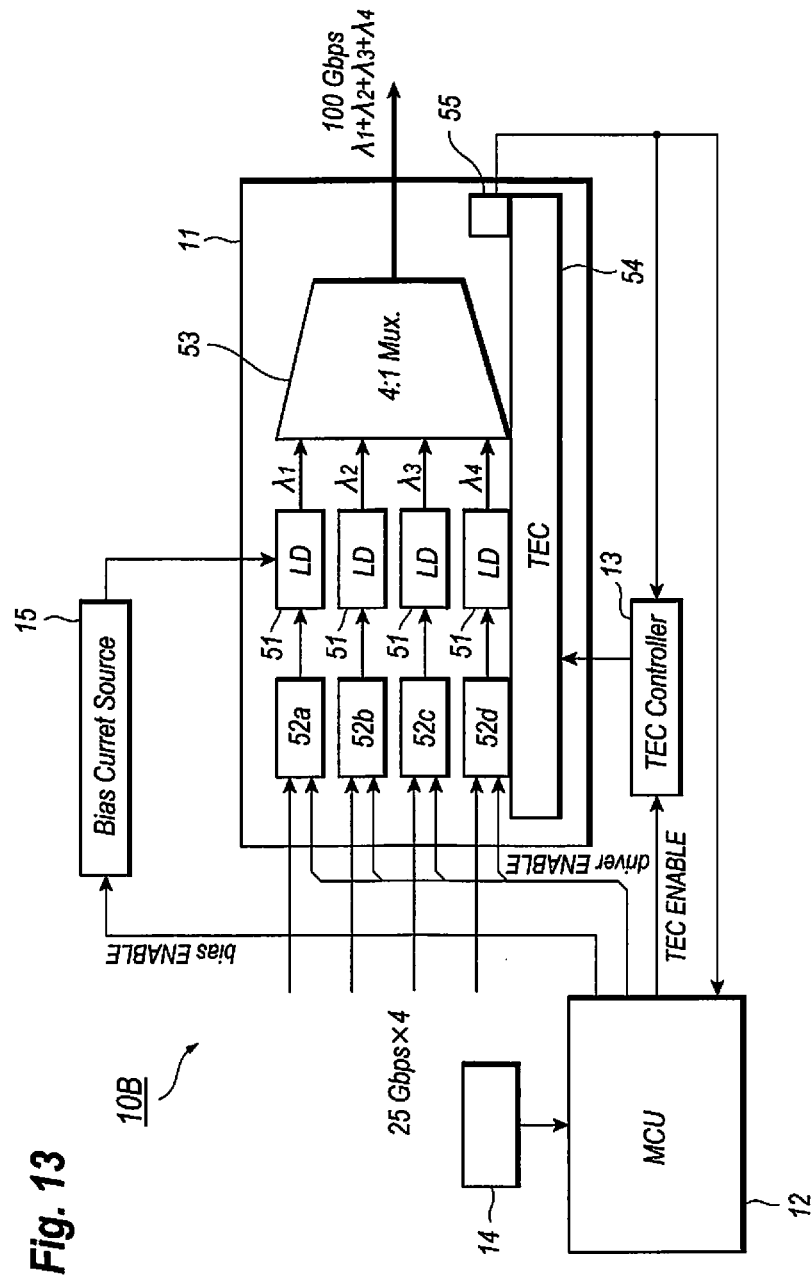
FIG. 13 is a functional block diagram of an optical transmitter according to the fourth embodiment.
Figure 14:
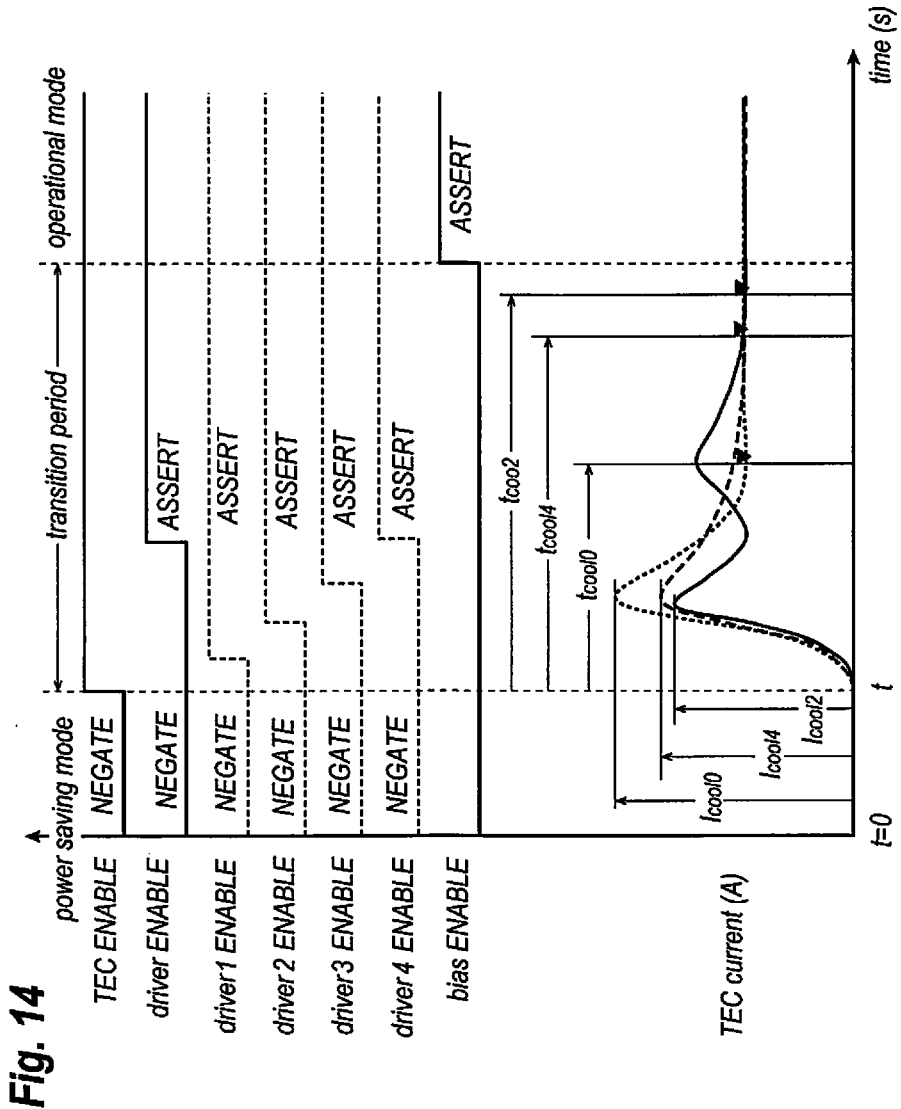
FIG. 14 shows behaviors of the TEC current attributed to the optical transmitter of the fourth embodiment.

Next, the fourth embodiment according to the present invention will be described as referring to FIG. 13 which shows a functional block diagram of an optical transmitter 10B of the fourth embodiment, and FIG. 14 shows behaviors of the TEC current. The optical transmitter 10B of the present embodiment provides four LD drivers, 52a to 52d, corresponding to respective LDs 51 and independently driven by respective signals.

For such an optical transmitter 10B, when the ambient temperature T1 exceeds the target temperature T0 and the top plate of the TEC 54 is necessary to be cooled down, respective LD drivers, 52a to 52d, are sequentially activated. The peak TEC current Icool4 for the arrangement shown in FIG. 14 may be substantially equal to the peak TEC current Icool2 of the aforementioned arrangement where only one LD driver 52 integrating four driving circuits. Moreover, the period tcool4 until the TEC current becomes stable may also become substantially equal to the period tcool2 corresponding to the arrangement of the integrating LD driver 52. Also, even when the current temperature T1 is lower than the target temperature T0, where the top plate of the TEC 54 is necessary to be heated up, delays for respective LD drivers, 52a to 52d, may be adjustable to obtain a result substantially same with that of the arrangement of the integrating LD driver 52.

While there has been illustrated and described what are presently considered to be example embodiments of the present invention, it will be understood by those skilled persons in the art that various other modifications may be made, and equivalents may be substituted, without departing from the true scope of the invention. For instance, the specification concentrates on an arrangement where an optical transmitter installs four (4) LDs driven by respective signals each having a speed of 25 Gbps. However, the number of channels and the speed are not restricted to this combination. Ten (10) channels each being applicable to a speed of 10 Gbps, which also achieves the total transmission speed of 100 Gbps, is applicable to the present invention. Also, the specification describes an algorithm that the MCU does not distinguish a case, where the current temperature is substantially equal to the target temperature, from another case where two temperatures are different from others. However, the algorithm may explicitly distinguish the former case from the latter, that is, when the current temperature is substantially equal to the target temperature, the operations for the TEC controller and the LD driver may be simplified. Therefore, it is intended that the present invention not be limited to the particular embodiments disclosed, but that the invention include all embodiments falling within the scope of the appended claims.

I claim:

1. An optical transmitter operable between a power saving mode and an operating mode, comprising:
   a transmitter module including a plurality laser diodes (LDs), an LD driver for driving the LDs electrically, and a thermo-electric cooler (TEC) for mounting the LDs and the LD driver thereon;
   a TEC controller to set temperatures of the LDs in a target temperature by driving the TEC;
   an ambient temperature sensor to sense an ambient temperature of the transmitter module; and
   a micro-control-unit (MCU) configured to control the TEC controller and the LD driver,
   wherein the MCU, when the optical transmitter changes from the power saving mode to the operating mode, first activates the TEC controller when the ambient temperature sensed by the ambient temperature sensor is higher than the target temperature in advance to activation of the LD driver, but first activates the LD driver when the ambient temperature is lower than the target temperature in advance to activation of the TEC controller.

2. The optical transmitter of claim 1,
   wherein the MCU determines a delay time from the activation of the TEC controller to the activation of the LD driver based on a difference between the ambient temperature and the target temperature at a beginning of the change from the power saving mode to the operating mode.

3. The optical transmitter of claim 2,
   further comprising a memory to store a relation between the delay time and the difference between the ambient temperature and the target temperature,
   wherein the MCU determines the delay time based on the difference between the ambient temperature and the target temperature.

4. The optical transmitter of claim 3,
   wherein the delay time linearly increases against the difference between the ambient temperature and the target temperature, and
   wherein the memory stores a slope of a linear relation of the delay time against the difference between the ambient temperature and the target temperature.

5. The optical transmitter of claim 3,
   wherein the delay time linearly increases against the difference between the ambient temperature and the target temperature but saturates when the difference exceeds an upper limit or less than a lower limit, and wherein the memory stores a slope of a linear relation of the delay time against the difference between the ambient temperature and the target temperature, the upper limit, and the lower limit.

6. The optical transmitter of claim 1,
wherein the MCU, when the ambient temperature is higher than the target temperature, first activates the TEC controller with a temporary target temperature lower than the target temperature as the target temperature, and subsequently activates the LD driver by replacing the temporary target temperature with the target temperature when the temperatures of the LDs become within a preset range around the temporary target temperature.

7. The optical transmitter of claim 5,
wherein the temporary target temperature is lower than the target temperature but higher than a temperature when the TEC controller flows a TEC current substantially equal to a TEC current at the target temperature without activating the LD driver.

8. A method to change an optical transmitter from a power saving mode to an operating mode, the optical transmitter comprising a transmitter module including a plurality of laser diodes (LDs), an LD driver configured to drive the LDs electrically, and a thermo-electric cooler (TEC) that mounts the LDs and the LD driver thereon, the method comprising steps of:
sensing an ambient temperature of the transmitter module;
comparing the ambient temperature with a target temperature of the LDs; and
when the ambient temperature is higher than the target temperature, first activating the TEC controller in advance to activation of the LD driver, but, when the ambient temperature is lower than the target temperature, first activating the LD driver in advance to activation of the TEC controller.

9. The method of claim 8,
wherein the activation of the LD driver is delayed by a delay time from the activation of the TEC controller depending on a difference between the ambient temperature and the target temperature.

10. The method of claim 9,
wherein the step of activating the TEC controller or the LD driver includes steps of
reading a relation between the delay time and the difference between the ambient temperature and the target temperature from the memory prior to the activation of the TEC controller or the LD driver, and
second activating the LD driver or the TEC controller delayed by the delay time determined by the relation between the delay time and the difference between the ambient temperature and the target temperature.

11. The method of claim 8,
wherein the step of first activating the TEC controller when the target temperature is lower than the ambient temperature includes steps of,
first activating the TEC controller by a temporary target temperature that is lower than the target temperature but higher than a temperature at which the TEC controller flows a TEC current substantially equal to a TEC current at the target temperature without activating the LD driver,
second activating the LD driver when the ambient temperature becomes within a present range around the temporary target temperature, and
revising the temporary target temperature by the target temperature.

12. The optical transmitter of claim 8,
further includes a step of activating a bias current source to provide bias currents to respective LDs after the temperatures of the LDs become within a preset range around the target temperature.

* * * * *